Figure 1:
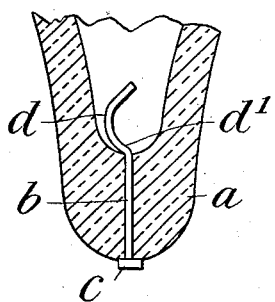

C. O. BASTIAN & G. CALVERT.
METHOD AND MEANS OF HERMETICALLY SEALING A CONDUCTOR IN GLASS.
APPLICATION FILED OCT. 19, 1906.

908,378.

Patented Dec. 29, 1908.

Witnesses:—
Stephen Kinsta
Adelaide B. Stille

Inventors:—
C. O. Bastian
and G. Calvert
by Wilkinson & Fisher
Their Attorneys

UNITED STATES PATENT OFFICE.

CHARLES ORME BASTIAN AND GEORGE CALVERT, OF LONDON, ENGLAND.

METHOD AND MEANS OF HERMETICALLY SEALING A CONDUCTOR IN GLASS.

No. 908,378.   Specification of Letters Patent.   Patented Dec. 29, 1908.

Application filed October 19, 1906. Serial No. 339,705.

*To all whom it may concern:*

Be it known that we, CHARLES ORME BASTIAN, electrical engineer, residing at 75 Brondesbury road, London, England, and GEORGE CALVERT, electrical engineer, residing at 27 Barretts Grove, Stoke Newington, London, England, both subjects of the King of Great Britain, have invented an Improved Method and Means of Hermetically Sealing a Conductor in Glass, of which the following is a specification.

This invention relates to a new or improved method and means of effecting an hermetic and gas pressure-tight joint or seal between a hard vitreous substance such as lead Jena or quartz glass and a wire, or metallic conductor of electricity, or other suitable substance, (of a different co-efficient of expansion to the hard vitreous substance) passing into or through such vitreous substances as for example through the walls of vessels constructed of or coated with such vitreous substances.

According to the present invention air-tightness of the joint—*i. e.* an hermetical seal—is formed between the glass or vitreous substance and the metal conductor (which latter may be of platinum copper or any suitable metal or alloy having a co-efficient of expansion different to the vitreous substance through or into or onto which it is to be sealed) by utilizing both the expansion and contraction of such metal in suchwise as to form and maintain such air-tight joint both when the latter is hot or heating and when it is cold or cooling that is to say the joint or seal is made at one point or place by the contractile action of the metal as and when it cools and is made at another and separate point or place as and when the said metal is expanded by heat but always in suchwise that the air tight joint or seal is made or formed at one such point or place before the joint or seal fails at the other point or place and thus maintaining a perfectly air-tight seal under all conditions.

To attain this end—and for the sake of example we will proceed to describe our present invention as carried into practice in the case of the vitreous part of a vapor electric apparatus—we so fashion or form the leading-in wire or metallic conductor as to utilize both its expansion and contraction so that in cooling it will cause a projection or projections or enlargements formed upon the wire to close or tighten itself or themselves upon the glass contiguous to such projections etc. after the manner of a heated rivet, passed through a metal plate and headed up, will contract and tighten itself upon said plate on cooling while when heated the diametrical expansion of the wire will form the seal.

When a metal of higher fusing point than the glass is used, we may form a head or shoulder, or a plurality of same upon the metal wire previous to fusing same into the glass, or melting, or molding, the molten glass round it, the disposition of the wire and its heads or shoulders being such that upon cooling it will contract and cause these heads to tend to approach one another and thus tighten the head or heads of the wire upon the glass to thereby form not only an absolutely gas-tight joint but a joint which can and will remain gas-tight during subsequent changes of temperature. Or the wire may have one head only the point of pull being obtained by adhesion of the length of wire where fused into the glass. Or the wire may be caused to take a tortuous or other than straight course or may be distorted or flattened or formed of varying cross-section to give it the necessary keying or holding effects so that the contraction may cause the head or heads or other parts of the wire to form the gas-tight joint with the said vitreous substance. In other cases the glass wall surrounding the metallic conductor may be suitably formed or fashioned as or with a receptacle in readiness for the insertion of the conductor which conductor may consist partially or wholly of a metal of a lower fusing point than the glass; this conducting metal being melted and run into the said receptacle so that upon cooling, same will form a pressure-tight joint as aforesaid. Or instead of or in addition to forming the joint as aforesaid we may employ a cap or any other suitable form of head or device on the wire etc. passing through the wall of vitreous substance and tightened thereonto or thereinto by the contractile action aforesaid. Or we may leave an aperture or apertures through the vitreous substance and shrink over said aperture or apertures and over or onto said vitreous substance a metallic substance in any suitable form such as a ferrule or sleeve or thimble or hood or cap etc. which will form a gas-tight closure over said aperture or apertures and which will by reason of the latter allow electrical contact to be made with said metallic substance from the inside of the wall etc. of such vitreous substance.

When employing a wire or the like for sealing through or into the glass same must be suitably proportioned (as to length and diameter) to the thickness of the glass wall to produce the required amount of contractile action.

Figure 2:
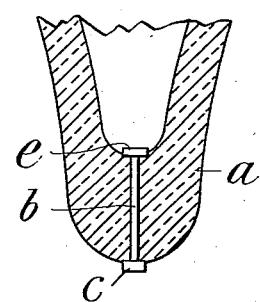
Figure 7:
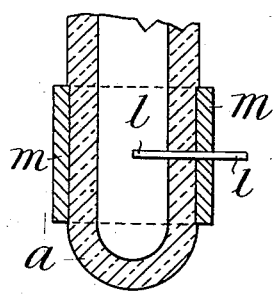
Figure 8:
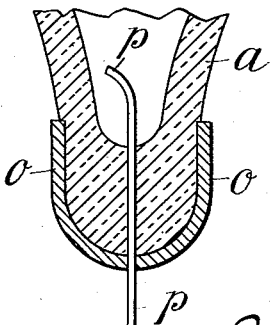

Figure 1, is a sectional view illustrating one form of our invention, and showing the glass partly broken away. Fig. 2, is a like view showing another form of our invention, and Figs. 3, 4, 5 and 6, similar views showing still different forms of our invention. Figs. 7 and 8 illustrate still further modifications.

In describing the accompanying drawings we will refer to the hard vitreous substance as "glass" and to the wire or other suitable electrical conductor as the "conductor".

Referring to Fig. 1 of the drawings:—$a$ is the glass wall of part of the vessel through which the conductor $b$ is hermetically sealed according to this invention by providing the outside end of said conductor $b$ with a head or enlargement $c$ thereon while the inner end $d$ of said conductor $b$ is bent sharply so as to form a shoulder $d'$ inside the wall of glass $a$.

In the arrangement shown in Fig. 2:—The conductor $b$ passes through the glass wall $a$ and is provided with a head or enlargement $c$ on the outside end as before and a similar head or enlargement $e$ on the inside end of said conductor. The length of the conductor $b$ between the shoulder $d'$ and the head $c$ in Fig. 1, or between the heads or enlargements $c$ $e$ in Fig. 2 being such that upon the glass $a$ being melted round the said previously formed conductors upon cooling taking place the heads or shoulders or enlargements on said conductor $b$ will be so contracted on or into the glass as to make a perfectly gas-tight joint—while upon any re-heating of the glass and conductor taking place sufficient to cause unsealing at these points $c$ and $d'$ or $c$ and $e$ the said hermetical seal will nevertheless be maintained by reason of the expansion of the part $b$ of the conductor upon the glass surrounding same—so that a constant hermetical seal is maintained either by the head or enlargements or along the length of the conductor $b$ or both. The relative sizes and proportions of the conductor and head or heads or enlargement thereon and the thickness of the glass wall may vary according to the nature of the respective materials employed but in the case of Jena glass for the part $a$ and platinum as the substance forming the conductor $b$ with heads or enlargements thereon, the relative proportions as illustrated in the drawings will be found suitable and correct.

Figure 3:
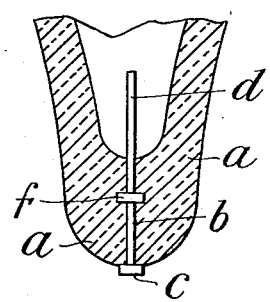
Figure 4:
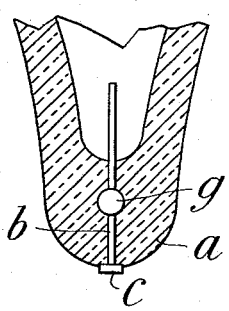
Figure 5:
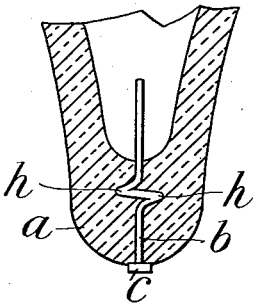

Referring now to Figs. 3 to 5 of the drawings:—In Fig. 3 the conductor $b$ is provided with a head $c$ as before on the exterior of the glass wall $a$; said conductor $b$ being also provided with an enlargement $f$ which is embedded or located within the thickness of the glass wall $a$ the inner end $d$ of the conductor in this case being straight or otherwise as desired. In Fig. 4 the conductor $b$ is shown provided with a flattened portion $g$ forming an enlargement which is located in the substance of the glass $a$ this enlargement $g$ serving the same purpose as the aforesaid enlargement $f$ Fig. 3. In Fig. 5, the conductor is provided with a spirally formed portion $h$ (or it may be zig-zag) which serves the same purpose as the aforesaid enlargement $g$ or $f$ embedded in the glass. In all the arrangements illustrated in Figs. 3 to 5 it will readily be understood that the sealing action is effected between the head or enlargement $c$ exterior of the glass and the enlargement $f$ or $g$ or $h$ embedded or located within the thickness of the glass wall as illustrated—the action being the same or similar to that described with reference to Figs. 1 and 2.

Figure 6:
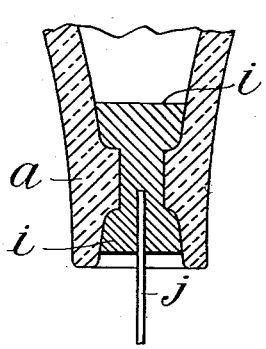

In Fig. 6 we have illustrated the arrangement wherein the glass $a$ is formed with an enlargement or passage into which the conducting material $i$ is poured in a molten state the internal formation of the glass at this point being such that upon cooling taking place the conducting material will be so contracted upon the glass as to form an hermetical seal as shown. $j$ is wire leading unto said conducting material $i$.

Referring now to Figs. 7 and 8:—In the arrangement shown in Fig. 7, the glass $a$ is made with a closed end while the conductor $m$ is made in the form of a sleeve or ferrule adapted to fit when heated closely upon the exterior of said glass wall $a$ (said glass wall and sleeve being of identical shape—either cylindrical or other suitable shape—in cross-section) so that upon cooling taking place said sleeve or ferrule $m$ will be shrunk or contracted tightly upon the glass wall $a$ and thereby form an hermetical seal or cover over the aperture in the glass through which the conducting wire $l$ is led through said sleeve $m$ and glass into the interior of the glass vessel $a$. In the arrangement shown in Fig. 8 the conducting wire $p$ is passed through the bottom of the glass vessel $a$ and a thimble or cap or inverted hood $o$ which incloses said end of the glass vessel $a$ and embraces the side walls thereof and makes a close fit therewith when hot so that upon cooling said thimble $o$ will be shrunk or contracted tightly upon the exterior walls of the glass $a$ and thereby make an hermetical seal, the conducting wire $p$ passing through said thimble $o$.

By this invention therefore we utilize the difference between the co-efficients of expansion and contraction between the electric conducting material and the hard vitreous substance by forming the said electric conducting material in suchwise that, upon cooling, same will thereby be caused to close or cover, in a gas-tight manner, an aperture or passage through the said vitreous substance; it being immaterial whether the conductor is contracted or shrunk upon the glass or vice-versa provided that in all cases this is effected in such a manner as to form an hermetical seal or closure of the aperture or passage through the glass in the aforesaid manner.

In practice we have found that when employing Jena combustion tubing a suitable conductor for use therewith is a hard drawn wire formed from an alloy of ninety per cent. of platinum with ten per cent. iridium.

What we claim is:—

1. The herein described method of hermetically sealing a wire or other suitable electrical conductor through a hard vitreous substance, which consists in providing said substance with a passage and said conductor with means, which upon cooling, will at one point in said passage hermetically close, in a gas-tight manner, the said passage, while upon heating said conducting material the said means will at another point in said passage hermetically close the same, also in a gas-tight manner, and thereby through expansion and contraction always maintain such passage gas-tight, substantially as described.

2. A hermetical seal for glass comprising a suitable electrical conductor sealed through said glass and having at a plurality of points heads or enlargements thereon, and adapted, through the expansions and contractions of said conductor, to maintain at all times a gas tight joint with said glass, substantially as described.

In witness whereof we have hereunto set our hands in presence of two witnesses.

CHARLES ORME BASTIAN.
GEORGE CALVERT.

Witnesses:
  H. D. JAMESON,
  A. NUTTING.